Jan. 15, 1963   C. J. DE MARCO   3,073,629
HOSE END FITTING FOR A HOSE MADE FROM
ANNULAR LAYERS OF FLEXIBLE FILM
Filed March 26, 1959   3 Sheets-Sheet 2

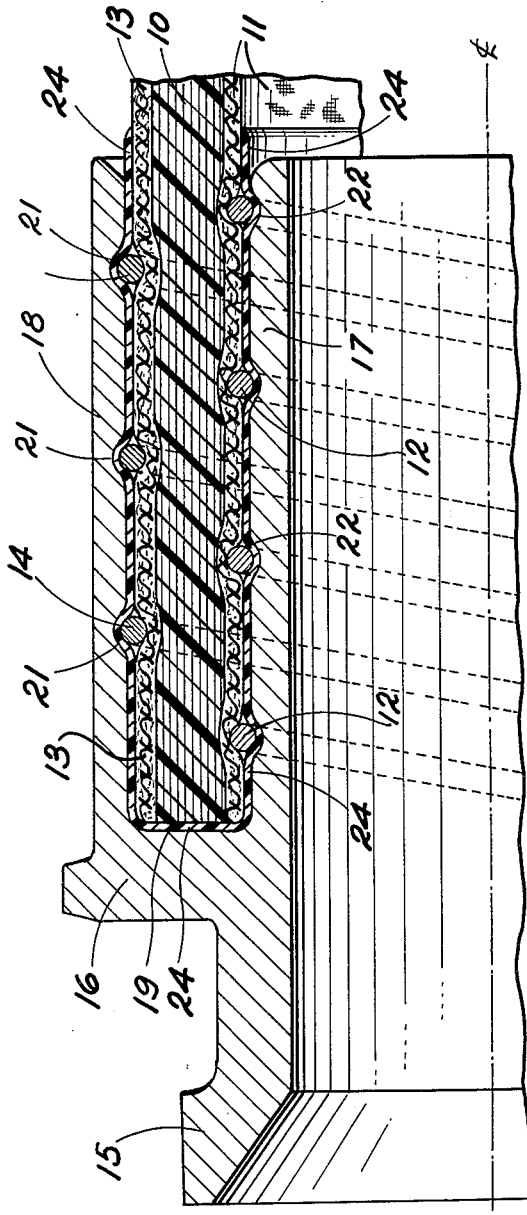
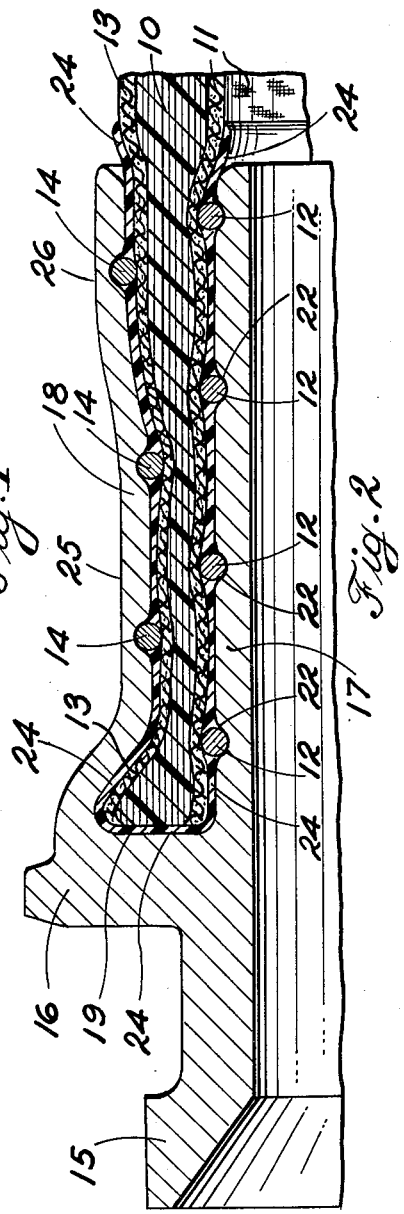

INVENTOR.
CURTISS J. De MARCO
BY
RICHEY, McNENNY & FARRINGTON
ATTORNEYS

Jan. 15, 1963

C. J. DE MARCO 3,073,629

HOSE END FITTING FOR A HOSE MADE FROM
ANNULAR LAYERS OF FLEXIBLE FILM

Filed March 26, 1959

INVENTOR.
CURTISS J. De MARCO

BY
RICHEY, McNENNY & FARRINGTON

ATTORNEYS

United States Patent Office 3,073,629
Patented Jan. 15, 1963

3,073,629
HOSE END FITTING FOR A HOSE MADE FROM ANNULAR LAYERS OF FLEXIBLE FILM
Curtiss J. De Marco, Cleveland, Ohio, assignor to The Weatherhead Company, Cleveland, Ohio, a corporation of Ohio
Filed Mar. 26, 1959, Ser. No. 802,110
3 Claims. (Cl. 285—256)

This invention relates to hose end fittings and hose end assemblies. The invention is particularly useful in conducting fluids under pressure at very low temperatures, such as liquid oxygen or nitrogen, while maintaining the hose sealed against leakage and gripped against axial separation from the hose and fitting.

At these low temperatures the usual hose materials become brittle and crack and leak under loads and vibration. It has been found that a hose comprising a large number of thin laminae of impervious material that does not become brittle at low temperatures, with inner and outer metal wire coils holding the impervious material in shape and carrying the pressure loads, handles such low temperature liquids satisfactorily, but it has not been possible heretofore to secure this hose in end fittings that both seal against leakage and resist axial forces satisfactorily.

The preferred hose comprises an inner helical coil of wire, preferably steel wire, and an inner layer of fabric material, preferably woven of synthetic fiber monofilaments such as "Dacron" or nylon. A thin sheet or tape of thermally stable, highly durable, water impervious material that retains its flexibility at very low temperatures, such as polyethylene terephthalate resin ("Mylar") film, is wrapped around the inner layer of woven fabric to form a fluid retaining core, and an outer layer of such fabric surrounds this fluid impervious core. An external helical coil of steel wire having the same helical pitch as the internal coil surrounds the outer fabric layer with its convolutions being between those of the inner coil. A hose of this preferred construction has adequate flexibility and resistance to leakage and bursting under the low temperature service conditions mentioned.

The hose end of the present invention secures an end of such a hose and maintains the same against leakage or axial separation in handling fluids under pressure at extremely low temperatures, despite vibrations and temperature and pressure fluctuations encountered in service.

According to one feature of this invention, the hose end includes a nipple to enter the hose and an external sleeve to surround the hose, the sleeve having a helical internal groove matching the external helical wire coil of the hose and receiving several convolutions thereof, the sleeve and the external wire coil of the hose being radially contracted or crimped after assembly. The trapping of several convolutions of the outer helical wire of the hose in the helical groove in the sleeve permits radial constraction of the wire in the same manner the continuous cylindrical sleeve is contracted radially by the crimping operation, and permanently locks the hose to the sleeve of the end fitting.

According to another feature of this invention, a film of sealing material, including a thermosetting resin which hardens or sets from heat or a catalyst while under pressure, is applied to a hose or hose end before assembly so as to lie, after assembly, between the outer surface of the nipple and the inner surface of the hose and, if desired, across the annular end surface of the hose and between the outer surface of the hose and the inner surface of the sleeve.

The sealing film is preferably a firm, dry film or tape which holds its position during assembly and is then activated or cured, either by solvents and catalysts before crimping or by heat after crimping, so as to become finally polymerized or "set" from the action of the heat or the catalysts, combined with the pressure produced by crimping. More specifically, the preferred sealing film according to this invention includes a thermosetting resin mixed with an elastomer such as acrylonitrile rubber producing a blended sealing and bonding film which does not become brittle at the low temperatures encountered in handling liquefied atmospheric gases.

According to another feature of this invention, both the inner surface of the sleeve and the outer surface of the nipple are formed with helical grooves matching, respectively, the outer and inner helical wire coils of the hose, permitting assembly by threading the parts together and providing a secure grip against axial loads after crimping.

These and other features and advantages of the present invention will appear from the following detailed description of preferred embodiments.

In the accompanying drawings:

FIG. 1 is a longitudinal section through one embodiment of the present invention showing an end of a hose assembled with a hose end before crimping;

FIG. 2 is a similar view showing the parts after crimping;

Figure 3:
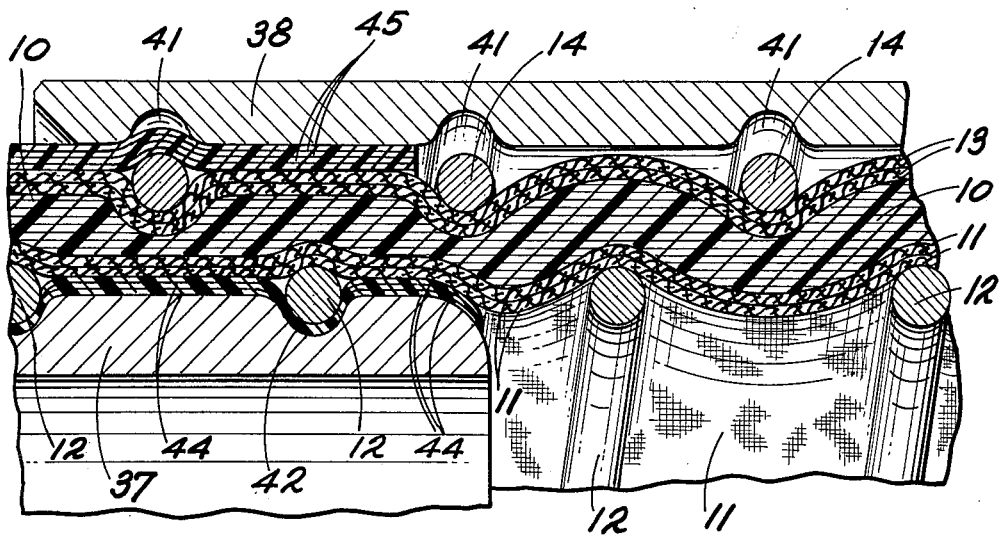
FIG. 3 is a fragmentary longitudinal section through another embodiment of the present invention showing the parts partially assembled.
Figure 4:
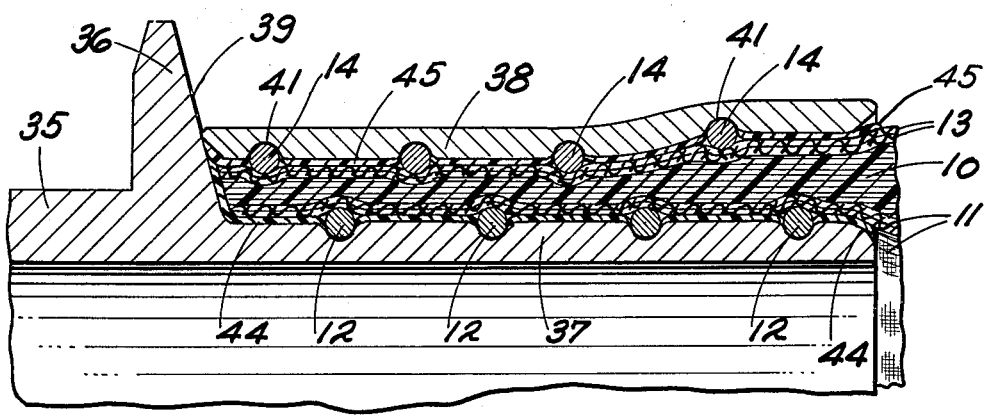
FIG. 4 is a fragmentary longitudinal section through the embodiment of FIG. 3 showing the parts after assembly and crimping.
Figure 5:
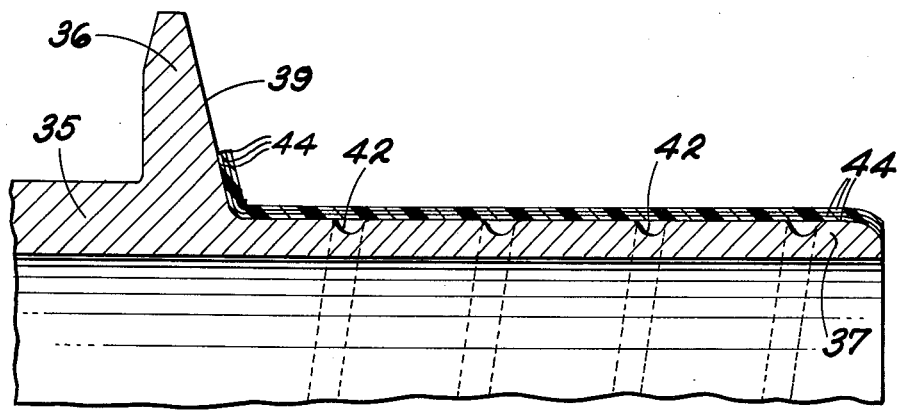
FIG. 5 is a longitudinal section through the nipple of the embodiment of FIGS. 3 and 4 before assembly with the hose.

The preferred form of hose with which the present invention is particularly useful is illustrated in connection with each of these embodiments. The walls of the hose consist of a large number of concentric layers 10 of thin synthetic sheet material of a kind which retains flexibility at the extremely low temperatures encountered in the handling of liquefied gases such as liquid oxygen or nitrogen or the like. A satisfactory film is a continuous, substantially impervious film of polyethylene terephthalate resin ("Mylar"). This synthetic resin film is wound or wrapped around an inner layer of material 11 which may be a woven fabric made of synthetic fiber monofilaments such as "Dacron." The inner layer 11 of fabric is wound about and supported on an inner helical coil 12 of spring tempered steel wire. Surrounding the layers of synthetic film 10 is an outer layer of woven fabric or the like 13 which may be made of the same material as the inner layer 11. Surrounding the outer layer of fabric 13 is an outer helical coil 14 of spring tempered steel wire.

Figure 6:
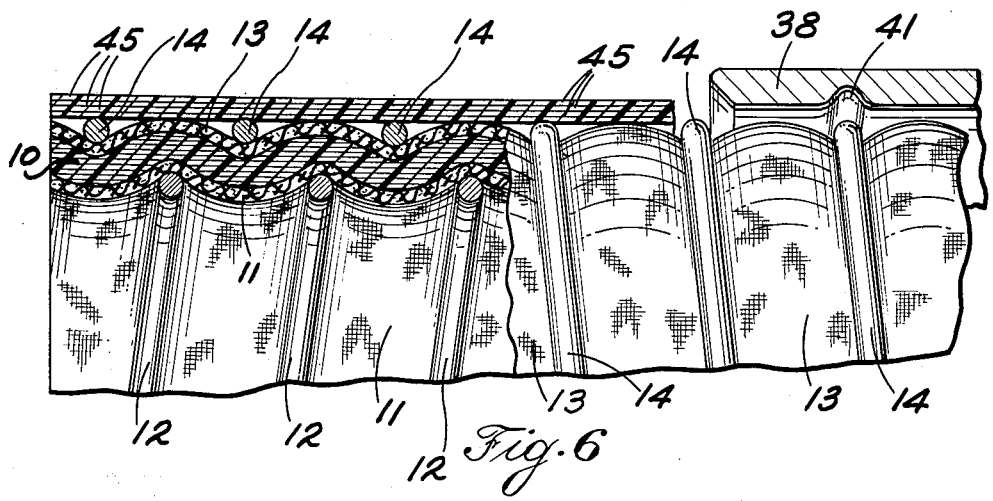
FIG. 6 is a longitudinal section of the hose and sleeve of the embodiment of FIGS. 3 and 4 partially assembled.

The inner and outer helical steel coils 12 and 14 are formed with the same helical pitch and with diameters differing by an amount less than the normal thickness of the hose material made up of the layers 10, 11 and 13. Thus, in the free, unstressed condition of the hose the convolutions of the inner steel spring 12 lie equally spaced between the convolutions of the outer steel spring 14, with the layers of hose material 10, 11 and 13 extending sinuously between convolutions as illustrated in FIGS. 3 and 6.

It will be understood that the inner and outer steel springs 12 and 14 maintain the hose in its cylindrical shape while permitting it to be bent or curved in any direction, the minimum radius of bending being determined by the spacing between successive convolutions of the springs 12 and 14. The steel springs 12 and 14 also provide mechanical strength resisting bursting or collapse of the hose. The inner and outer fiber layers 11 and 13 are of sufficient strength and thickness to support the resin film and to transmit bursting or collapsing stresses between the successive convolutions of each of the springs 12 and 14, so that these stresses are carried by the springs rather than the laminae 10.

In the embodiment shown in FIGS. 1 and 2 the hose end comprises a metal body portion 15 which may be any desired member or fitting to which a free end of the hose is to be attached. A radial flange 16 extends outwardly from the body portion 15 and, if desired, may have its periphery formed as a wrench receiving surface. Extending forwardly from the flange 16 is an integral tubular nipple 17 adapted to fit within the bore of the hose to be connected. An outer sleeve 18 is also formed integral with the flange 16 and extends forwardly therefrom substantially concentric with the nipple 17 and spaced radially therefrom to provide an annular space for the reception of the hose. A forwardly facing substantially radial annular surface 19 on the flange 16 forms the bottom wall of the hose receiving recess between the nipple 17 and the sleeve 18. These parts may be of any suitable metal, such as carbon steel or stainless steel, which has sufficient ductility to permit crimping of the sleeve.

As illustrated in FIG. 1, the inner surface of the sleeve 18 is formed with a continuous helical groove 21 which has the same helical pitch as the outer steel spring 14 of the hose in its normal unstressed condition. The diameter of the inner surface of the sleeve 18 is slightly less than, and the diameter of the helical groove 21 is slightly greater than, the diameter of the outer steel spring 14 in its normal unstressed condition so that an end of the hose can readily be threaded into the sleeve 18 by rotating the hose so that the outer steel spring 14 enters and threads its way along the helical groove 21 until the free end of the hose abuts the end wall 19.

As shown in FIGS. 1 and 2 the outer surface of the nipple 17 is also formed with a continuous helical groove 22 which has a pitch equal to the pitch of the inner helical spring 12 of the hose and a diameter slightly less than the internal diameter of the spring 12 in its normal unstressed condition. The convolutions of the helical groove 22 are spaced between the convolutions of the helical groove 21 in the sleeve 18 by an amount equal to the spacing between the convolutions of the inner and outer helical springs 12 and 14 so that the inner coil 12 can be threaded into and along the helical groove 22 at the same time that the outer coil spring 14 is being threaded into the helical groove 21.

As shown in FIG. 1, between three and four complete convolutions of each of the springs 12 and 14 are threaded into the grooves 22 and 21. The number of convolutions trapped in the grooves may be varied as desired by varying the lengths of the nipple 17 and sleeve 18. It is important that more than one complete convolution of the spring 14 be trapped in its groove to insure proper action during the subsequent crimping operation.

In the embodiment of FIGS. 1 and 2, the sealing feature of the present invention is achieved by coating the end portion of the hose with a layer 24 of sealing and bonding material. As shown, the layer or coating 24 extends between the nipple 17 and the inner fabric layer 11 of the hose, between the annular end surface of the hose and the end wall 19 and between the sleeve 18 and the outer fabric layer 13. The layer 24 includes a monomer of a thermosetting resin which polymerizes or "sets" from a combination of pressure and either heat or a catalyst. This may be a phenol-aldehyde resin, an epoxy resin, or any similar thermosetting resin.

Preferably the sealing material includes a phenol-aldehyde resin and also includes a nitrile rubber adhesive comprising acrylonitrile rubber or the like masticated and mixed in a solvent with the polymerizable material. Such a mixture provides a viscous, stable liquid and, after evaporation of the solvent, a firm, stable film until it is activated by either heat or acetone and pressure. The initial formulation solvent may be acetone or methylethyl ketone or the like. In the embodiment of FIGS. 1 and 2 the sealing material is used as a viscous liquid into which the end of the hose is dipped. After dipping the end of the hose, the solvent may be evaporated to form the layer or coating 24 extending over and tightly adhering to the inner and outer end portions of the hose and the exposed outer surfaces of the springs 12 and 14.

When applied in this way the sealing and bonding material 24 adheres tightly to the exposed surfaces of the hose and remains in position during the assembly of the parts by screwing the helical springs 12 and 14 into the helical grooves 21 and 22 to form the assembly illustrated in FIG. 1.

After assembly of the hose into the hose end the sleeve 18 is crimped by crimping dies forced radially inward to reduce the diameter of the sleeve and permanently secure the hose to the hose end. During this crimping action the sleeve 18 throughout substantially its entire circumference is forced radially inwardly, the metal being caused to flow and to increase the wall thickness of the sleeve to accommodate at least part of the reduction in circumference. The helical spring 14, being trapped in the helical groove 21, is reduced in diameter in the same way as the sleeve 18, the metal of the spring 14 being caused to flow to increase the cross sectional area of the spring in proportion to the reduction in circumference.

The inner helical spring 12 is similarly deformed tightly against the nipple 17 by the crimping pressure transmitted through the hose material trapped in the space between the sleeve and the nipple. Preferably the sleeve 18 is crimped inwardly through a length 25 beginning near the radial flange 16 and extending forwardly through one or two complete convolutions of the outer spring 14. The free end portion 26 of the sleeve 18, extending from the area 25 to the open end of the sleeve, is also crimped inwardly but through a shorter radial distance than the portion 25. This is preferably done with stepped crimping dies which first engage the area 25 and start crimping it inwardly, firmly binding the springs 12 and 14 against any axial movement, and then engage the portion 26 and crimp it inwardly during the final part of the crimping of the portion 25.

The thermosetting resin in the preferred sealing material 24 may be activated by dipping the assembly into acetone or methylethyl ketone after the hose has been assembled with the hose end and prior to crimping. The acetone softens the sealing material, permitting it to permeate into the hose material and into intimate contact with the metal parts. After crimping the assembly has the form shown in FIG. 2 and the sealing material 24 is gripped and held under substantial pressure. Under these conditions the thermosetting resin polymerizes or cures either by air drying at normal temperatures or more rapidly by oven drying the crimped assembly at about 275° to 300° F.

When the sealing material is to be activated by heat the hose end is first crimped and thereafter heated to about 275° to 300° F. The initial heating softens the sealing material so that it flows into intimate contact with all of the parts and permeates the hose from the pressure created by the crimping action, and continued heating for several seconds cures or polymerizes the resin. Either method results in a strong bond between the various parts and a continuous impervious sealing film.

In the embodiment of the invention shown in FIGS. 3 to 6 the hose end itself is made in two parts. The member 35 is provided with an integral wrench receiving radial flange 36 and an integral tubular nipple portion 37. The sleeve 38 is formed as a separate cylindrical tubular member of metal having sufficient ductility to permit crimping, such as carbon steel, stainless steel, or the like.

The inner surface of the sleeve 38 is formed with a continuous helical groove 41 which has the same helical pitch as the outer coil spring 14 of the hose. Similarly, the outer surface of the nipple 37 is formed with a continuous helical groove 42 corresponding to the inner coil spring 12 of the hose.

In this form the sealing material is used as a tape or film. The material itself may be the same as that described in connection with FIGS. 1 and 2, that is, a mixture of a phenol-aldehyde thermosetting resin with acrylonitrile rubber made into a film or tape by evaporation of most of the initial formulation solvent. Several convolutions 44 of such a tape are wound onto the nipple 37 and radially outward along the forward end surface 39 of the radial flange 36. The sleeve 38 is threaded onto the end of the hose by screwing the outer coil spring 14 in the helical groove 41 so as to move the sleeve along the hose past the portion which is to be gripped in the final assembly as illustrated in FIG. 6. The tape or film of sealing material is then applied over the outer surface of the end portion of the hose which may be by a number of convolutions 45.

The nipple 37 is then screwed into the interior of the hose by threading the inner helical coil 12 in the helical groove 42 in the nipple 37 and the sleeve 38 is screwed rearwardly so that the free end of the host and the rearward end of the sleeve 38 both abut firmly against the surface 39 of the radial flange 36. The assembly is crimped in the same manner as described in connection with FIGS. 1 and 2 into the final form of FIG. 4. In this form the rearward end of the sleeve is crimped inwardly immediately adjacent the radial flange 36, and the forward end portion 46 is crimped inwardly a lesser amount. Both crimped portions deform and reduce the diameter of the outer coiled spring 14 of the hose.

As in the first embodiment, the sealing material consisting of the tape or film 44 and 45 may be activated either by dipping the assembly into acetone or methylethyl ketone before crimping, or by heating to 275° to 300° F. after crimping. In either event the material softens and flows into intimate contact with the parts and permeates the hose. After crimping into the form shown in FIG. 4 the pressure applied to the sealing material combined wtih either the heat or the effect of the acetone causes the thermosetting resin to polymerize and harden as previously described, providing a tight, strong bond and a continuous impervious seal.

While preferred embodiments of the invention have been described in considerable detail it is to be understood that various modifications and rearrangements of parts may be resorted to without departing from the scope of the invention as defined in the following claims.

What is claimed is:

1. A hose and crimped hose end assembly comprising a flexible hose having a terminal end surface including an inner helical coil of metal wire, an inner fabric layer surrounding said inner wire coil, a plurality of superimposed unbonded annular layers of synthetic resin flexible film of fluid impervious material wrapped around said inner fabric layer, an outer fabric layer surrounding said layers of film and an outer helical coil of metal wire surrounding said outer fabric layer, said annular layers of flexible film being held together solely by said inner and outer fabric layers and said inner and outer wire coils a metal hose end secured to an end of said flexible hose comprising a hollow nipple disposed within said hose, an end wall extending radially outward from said nipple adjacent the end surface of said hose and a sleeve extending from said end wall along the outer surface of said hose and crimped radially inwardly and squeezing the end portion of said hose between the inner surface of said sleeve and the outer surface of said nipple, said outer wire coil being compressed within said sleeve to a reduced diameter and recessed into the inner surface of said sleeve, said inner wire coil being recessed into the outer surface of said nipple, and a body of sealing material bonded to the inside and outside of said hose and to said hose end and to the terminal end surface of said hose and to said radial end wall, said sealing material comprising curable plastic material which has been compressed between said sleeve and said nipple into said inner and outer fabric layers and the end surface of said hose and around said inner and outer wire coils and thereafter cured in place to form an unbroken seal and bond extending the full length of said nipple between the outer surface of said nipple and said inner fabric layer, between said end wall and said terminal end surface of said hose, and the full length of said sleeve between the inner surface of said sleeve and said outer fabric layer.

2. A hose and hose end assembly as defined in claim 1 in which said flexible film of fluid impervious material consists of polyethylene terephthalate, and said sealing material includes a resin selected from the group consisting of phenol aldehyde resins and epoxy resins.

3. A hose and hose end assembly as defined in claim 2 in which said sealing material also includes a nitrile type rubber.

References Cited in the file of this patent

UNITED STATES PATENTS

| | | |
|---|---|---|
| 199,349 | Cuswell | Jan. 22, 1878 |
| 1,985,494 | Gish | Dec. 25, 1934 |
| 2,121,624 | Cowles | June 21, 1938 |
| 2,152,681 | Caminez | Apr. 4, 1939 |
| 2,453,997 | MacWilliam | Nov. 16, 1948 |
| 2,785,910 | Munger | Mar. 19, 1957 |
| 2,800,145 | Peierls | July 23, 1957 |
| 2,920,910 | Schnabel | Jan. 12, 1960 |
| 2,943,644 | Moseley | July 5, 1960 |

FOREIGN PATENTS

| | | |
|---|---|---|
| 667,145 | Germany | Jan. 9, 1936 |
| 702,913 | Germany | Jan. 23, 1941 |
| 617,025 | Great Britain | Jan. 31, 1949 |
| 640,420 | Great Britain | July 19, 1950 |